United States Patent

Schwerdhofer

[15] 3,696,690
[45] *Oct. 10, 1972

[54] AUTOMATICALLY SHIFTING MULTIPLE SPEED HUB

[72] Inventor: Hans Joachim Schwerdhofer, Schweinfurt am Main, Germany

[73] Assignee: Fichtel & Sachs AG, Schweinfurt am Main, Germany

[*] Notice: The portion of the term of this patent subsequent to Dec. 15, 1987, has been disclaimed.

[22] Filed: Dec. 14, 1970

[21] Appl. No.: 97,519

Related U.S. Application Data

[63] Continuation of Ser. No. 830,779, June 5, 1969, Pat. No. 3,546,971.

[30] Foreign Application Priority Data

June 15, 1968 Germany..........P 17 50 897.3

[52] U.S. Cl. .................................................74/752 E
[51] Int. Cl..............................................F16h 5/42
[58] Field of Search ....................................74/752 E

[56] References Cited

UNITED STATES PATENTS

| | | |
|---|---|---|
| 3,143,005 | 8/1964 | Schwerdhofer..............74/752 |
| 3,432,013 | 3/1969 | Matsamoto...............74/750 X |
| 3,438,283 | 4/1969 | Schwerdhofer..........74/752 X |
| 3,492,893 | 2/1970 | Shimano et al..............74/752 |
| 3,494,227 | 2/1970 | Shimano et al..............74/752 |

*Primary Examiner*—Arthur T. McKeon
*Attorney*—Kelman and Berman

[57] ABSTRACT

A bicycle hub having built in planetary gears arranged in tandem for providing three or more transmission ratios is equipped with an overrunning pawl-and-ratchet clutch between the driver and the ring gear of the first set of planet gears and with a centrifugal governor, which is connected either with the hub shell or the driver for rotation thereby, and operates a second clutch interposed between the driver and the planet carrier of the first set of planet gears. The arrangement permits a relatively great number of transmission ratios to be achieved with a minimum number of centrifugal governors.

4 Claims, 7 Drawing Figures

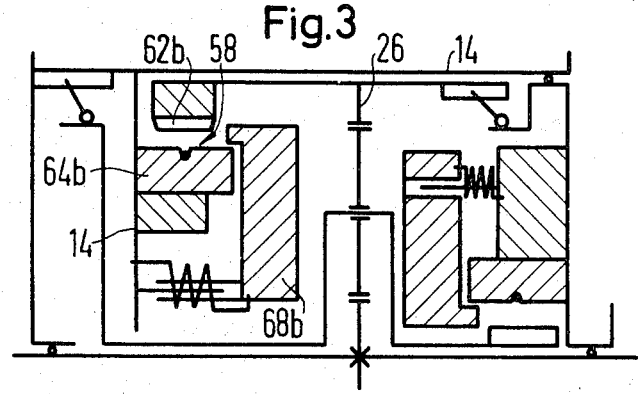
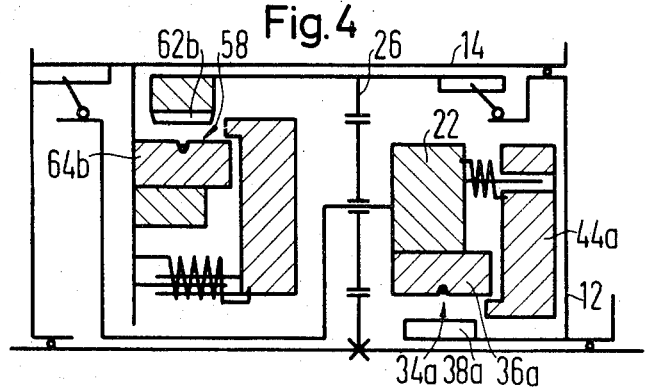

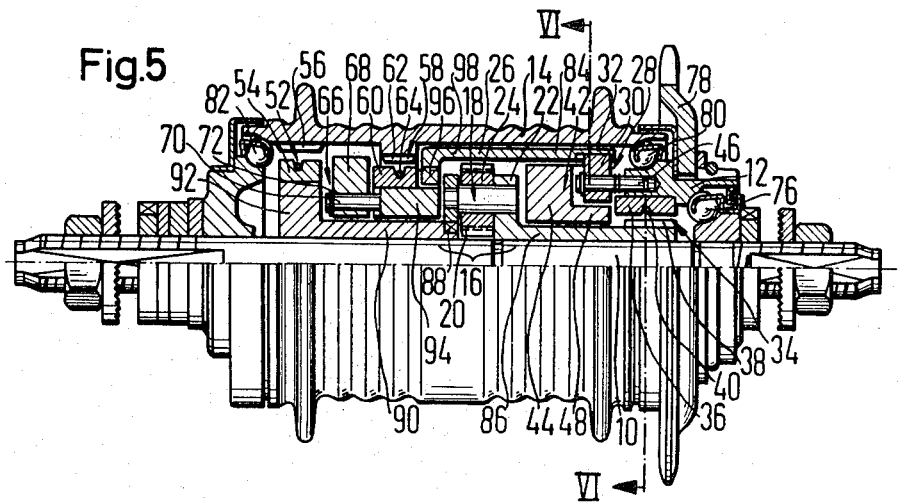
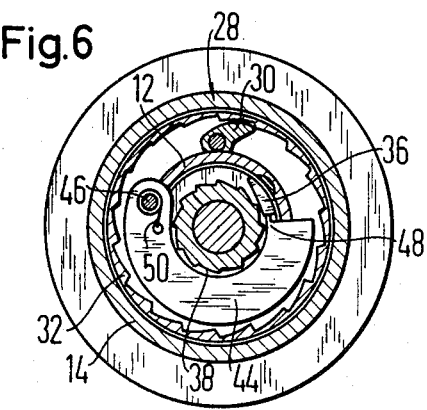

AUTOMATICALLY SHIFTING MULTIPLE SPEED HUB

This application is a continuation of my copending application Ser. No. 830,779, filed on June 5, 1969, and now U.S. Pat. No.3,546,971.

This invention relates to automatically-shifting multiple-speed hubs for bicycles and like vehicles, and particularly to centrifugally controlled hubs having three or more speeds or transmission ratios.

Known multiple speed-hubs employ planetary gearing and overrunning clutches interposed between the several elements of one or more sets of planetary gearing and the hub shell. The desired speed ratio is set by engaging and disengaging the clutches. Since a set of planetary gearing includes only two elements which coaxially rotate at different speeds, usually the planet carrier and the ring gear, the known three-speed hubs of this type, require two sets of planetary gearing in driving series connection, that is, only one set less than the number of available speeds, and a set of planetary gearing must be added for each desired additional speed.

The planetary gearing occupies much space in the hub shell and is usually the most expensive part of the hub. The primary object of the invention thus is the provision of an automatically shifting multiple speed hub in which at least three speeds are achieved by means of a number of sets of planetary gearing which is smaller than in known hubs having an equal number of available speeds or transmission ratios.

With this object and others in view, as will hereinafter become apparent, the invention provides an improvement in the known type of hub for a bicycle or like vehicle in which a driver and a hub shell are mounted on a normally stationary shaft for rotation relative to the shaft and each other, and a transmission is interposed between the driver and the hub shell for rotating the latter at each of a plurality of speeds or transmission ratios when the driver rotates about the shaft axis. The transmission includes a first planetary gear set consisting of a sun gear fixedly fastened to the shaft, a planet carrier and a ring gear rotatable about the axis of the shaft, and at least one planet gear mounted on the carrier in simultaneous meshing engagement with the sun gear and the ring gear. A first clutch is interposed between the driver and the ring gear, a second clutch between the driver and the planet carrier, a third clutch between the planet carrier and the hub shell, and a fourth clutch between the ring gear and the hub shell.

According to this invention, the first clutch is an overrunning clutch which permits free rotation of the hub shell at a speed higher than that of the driver. A centrifugal governor is connected to the second clutch and to a first member of the pair constituted by the driver and the hub shell in such a manner as to operate the second clutch in response to a change in the rotary speed of the first member.

The fourth clutch is preferably operated by a second centrifugal governor driven by a member of the aforementioned pair in response to a change in the rotary speed of the connected member. In this arrangement, the third clutch is an overrunning clutch.

When a second planetary gear set of the same general type as the first-described set is used, the ring gear of the second set is connected with the planet carrier of the first set for joint rotation, an additional overrunning clutch is interposed between the planet carrier of the second set and the hub shell, and an additional centrifugal governor operates the additional clutch in response to a speed change in the driver or hub shell. A further centrifugal governor operates the fourth clutch in an analogous manner.

The centrifugally controlled clutches are preferably of the pawl-and-ratchet type, and the flyweight of the associated governor is movably mounted on a common support with the pawl, the pawl being movable on the support toward and away from a position of torque-transmitting engagement with the associated ratchet portion.

Other features, additional objects, and many of the attendant advantages of this invention will readily become apparent as the same becomes better understood by reference to the following detailed description of preferred embodiments when considered in connection with the appended drawing in which:

FIGS. 1 to 4 show three-speed hubs of the invention in conventional symbols, one half of each hub being represented in axial section;

FIG. 5 is an elevational view, partly in axial section, of the hub of FIG. 1;

FIG. 6 illustrates the hub of FIG. 5 in radial section on the line VI — VI; and

Figure 1:
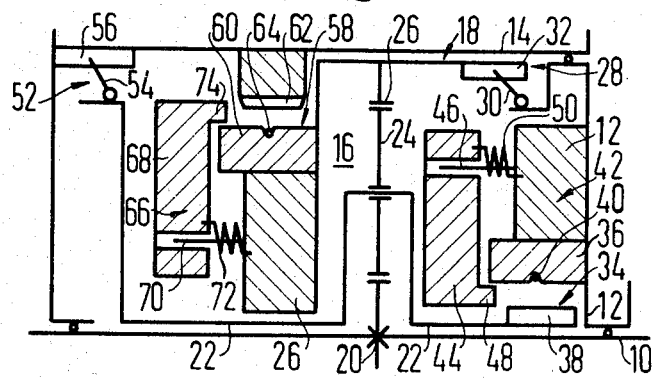

Referring now to the drawing in detail, and initially to FIG. 1, there is seen a normally stationary shaft 10 for the rear wheel of a bicycle. A driver 12 is rotatably mounted on the shaft. The two axial ends of a hub shell 14 are rotatably supported on the driver 12 and on the shaft 10 respectively, and the shell encloses the mechanism 16 which transmits rotary movement from the driver 12 to the shell 14 at any one of three different transmission ratios, the transmission ratio being selected automatically in response to the rotary speed of the hub shell on the shaft 10.

The mechanism 16 includes only one planetary gear set 18 whose sun gear 20 is integral with or fixedly mounted on the shaft 10 as is conventional. A planet carrier 22 coaxially rotatable on the shaft 10 carries three planet gears 24 of which only one is seen in FIG. 1. The planet gears simultaneously mesh with the sun gear 20 and with internal teeth on a ring gear 26.

A first clutch 28 is interposed between the driver 12 and the ring gear 26. It mainly consists of a pawl 30 secured on the driver 12 and a ratchet rim 32 on the ring gear 26. A pawl spring, not shown, biases the pawl 30 toward driving engagement with the ratchet rim 32.

A second clutch 34 may connect the driver 12 with the planet carrier 22. It includes a pawl 36 on the driver 12 and a ratchet rim 38 on the planet carrier 22. An open ring 40 of spring steel wire biases the pawl 36 toward engagement with the rim 38, and is representative of other pawl springs in the hub, not specifically shown. A first centrifugal governor 42 controls the clutch 34. The governor includes a centrifugal weight 44 hingedly mounted on the driver 12 by means of a pivot pin 46. A boss 48 on the weight 44 engages the pawl 36. A return spring 50 connects the weight 44 and the driver 12 in such a manner as to oppose movement of the weight away from the hub axis under the influence of centrifugal forces, and to bias the weight toward the illustrated position in which the boss 48 holds the pawl 36 out of engagement with the ratchet rim 38.

A third clutch 52 is interposed between the planet carrier 22 and the hub shell 14. It includes a pawl 54 mounted on the carrier 22, a ratchet rim 56 on the hub shell 14, and a non-illustrated pawl spring which biases the pawl 54 toward the rim 56.

A fourth clutch 58 is provided for connecting the ring gear 26 with the hub shell 14. It consists essentially of a pawl 60 mounted on the ring gear 26, a ratchet rim 62 on the hub shell 14, and a pawl spring 64 which cooperate as described above. A second centrifugal governor 66 controls the fourth clutch 58 and includes a centrifugal weight 68, identical with the weight 44, pivotally mounted on the ring gear 26 by means of a pin 70, and equipped with a return spring 72 which biases the weight 68 toward the illustrated position in which a boss 74 on the weight 68 engages the pawl 60 to keep the clutch 58 disengaged.

The three-speed hub, as far as illustrated in FIG. 1, operates as follows:

At low rotary speeds of the driver 12, the driver is coupled to the ring gear 26 by the first clutch 28. The ring gear drives the planet carrier 22 at a reduced speed, and rotation at the reduced speed is transmitted from the planet carrier 22 to the hub shell 14 by the third clutch 52. The hub shell 14 and the non-illustrated other elements of the rear wheel rotate more slowly than the driver 12. The transmission ratio of the hub is at its lowest value.

As the rotary speed of the driver 12 increases, the centrifugal forces acting on the weight 44 can overcome the restraint of the return spring 50, and the first centrifugal governor 42, in cooperation with the pawl spring 40, engages the second clutch 34, whereby the planet carrier 22 is directly coupled to the driver 12. The ratchet rim 32 of the first clutch 28 overruns the pawl 30. The hub shell 14 is driven from the planet carrier 22 by the third clutch 52. The hub shell rotates at the same speed as the driver 12. The transmission ratio of the hub is at an intermediate value.

The return springs 50,72 are selected in such a manner that the second centrifugal governor 66 does not permit engagement of the fourth clutch 58 until the hub shell 14 rotates at a speed higher than that at which the first governor 42 engages the second clutch 34. At that higher speed, the second governor permits engagement of the pawl 60 with the ratchet rim 62. Torque is transmitted from the driver 12 by the engaged second clutch 34 to the planet carrier 22, from the latter to the ring gear 26 which is rotated at a speed higher than the common speed of the driver 12 and of the planet carrier 22, and from the ring gear to the hub shell 14 by the engaged fourth clutch 58. The hub shell rotates faster than the driver, and the transmission ratio of the hub is at its highest value.

Figure 2:
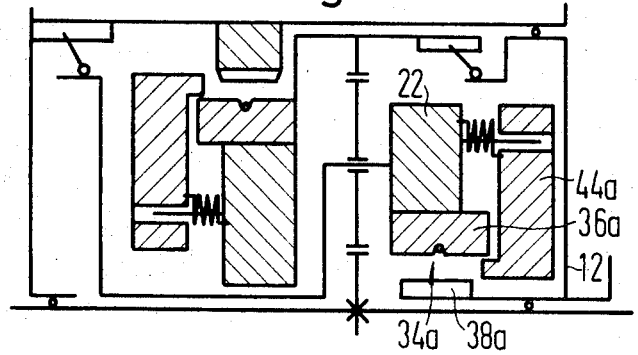

The modified three-speed hub shown in FIG. 2 differs from the apparatus shown in FIG. 1 by a modified second clutch 34a. It includes a pawl 36a on the planet carrier 22 and a ratchet rim 38a provided on the driver 12a. The associated centrifugal governor correspondingly has a centrifugal weight 44a hingedly secured to the planet carrier. The operation of the apparatus is not affected by the interchange of cooperating clutch and governor elements between the driver and the planet carrier.

In the modified hub illustrated in FIG. 3, the fourth clutch 58 has a pawl 64b mounted on the hub shell 14 and a cooperating ratchet rim 62b arranged on the ring gear 26. The centrifugal weight 68b rotates with the pawl 64b and is mounted on the hub shell 14.

The embodiment of the invention illustrated in FIG. 4 combines the modified second and fourth clutches described above with reference to FIGS. 2 and 3 with the otherwise substantially unchanged structure of the hub illustrated in FIG. 1. The hubs of FIGS. 3 and 4 operate as described with reference to FIG. 1 with such modifications in the choice of the return springs as will be needed to provide speed changes at the desired wheel speeds.

The hub of FIG. 1 is shown more realistically in the views of FIGS. 5 and 6 which also include elements omitted from the showing of FIG. 1 and the corresponding views of FIGS. 2,3,4, and 7 for the sake of clarity.

The driver 12 rotates on a ball bearing 76 mounted on the shaft 10 and is fixedly fastened to a drive sprocket 78 extending outside the shell 14, as is conventional. Ball bearings 80,82 on the driver 12 and on the stationary shaft 10 support the two axial ends of the hub shell 14. The pawl 30 of the first clutch 28 is attached to a radial face of the driver 12, and engages an internal rim of ratchet teeth 32 on a tubular projection 84 of the ring gear 26.

The planet carrier 22 has a long tubular hub 86 rotatably supported on the shaft 10 and axially partly coextensive with the carrier 12. Interengaged projections 88 fixedly connect the planet carrier 22 in the assembled hub with one end of a sleeve 90. The other end of the sleeve, remote from the centrally arranged sun gear 20 in a direction away from the driver 12 has a radial flange 92 on which the pawl 54 of the third clutch 52 is mounted. A ring 94 rotatably mounted on the sleeve 90 is fixedly connected by interengaged teeth 96 with a tubular extension 98 of the ring gear 26, the teeth 96 being remote from the driver 12. The ring 94 carries the pawl 60 of the fourth clutch 58 and the weight 68 of the associated second centrifugal governor 66.

The manner in which the centrifugal weight 44 is mounted on the driver 12 by means of the pivot pin 46, and the engagement of the boss 48 with the pawl 36 of the second clutch 34 under the biasing force of the spring 50 are best seen in FIG. 6 which also shows the cooperating elements of the first clutch 28. The operation of the hub shown in FIG. 5 has been described with reference to FIG. 1.

Figure 7:
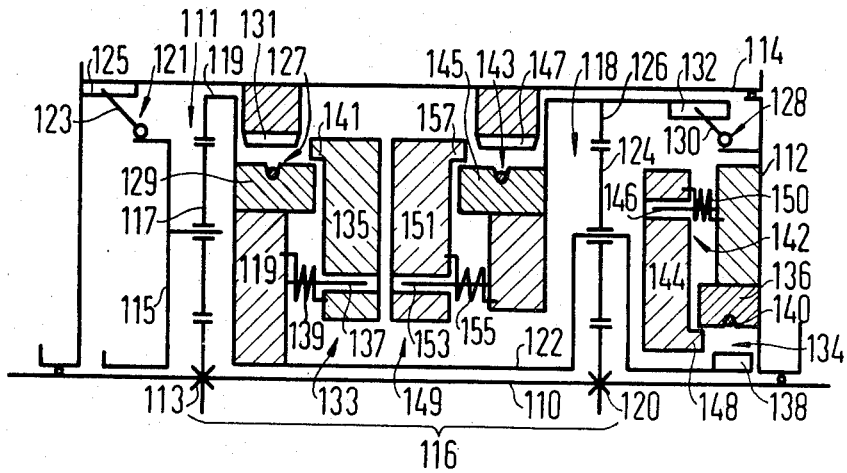
FIG. 7 shows a four-speed hub of the invention in the manner of FIGS. 1 to 4.

The four-speed hub illustrated in FIG. 7 has many elements analogous to those of the hub shown in FIG. 1, and corresponding reference numerals, augmented by 100, have been used for designating the related parts of the hub of FIG. 7.

The hub has a stationary shaft 110 on which a driver 112 is mounted for coaxial rotation. The two axial ends of a hub shell 114 are rotatably mounted on the shaft 110 and the driver 112 respectively. The hub shell encloses a four-speed transmission mechanism 116. The mechanism includes a first set 118 of planetary gearing which consists of a sun gear 120 on the shaft 110, a planet carrier 122 coaxially rotatable about the shaft 110 and carrying planet gears 124 which mesh with the sun gear 120 and a ring gear 126.

A first overrunning clutch 128 capable of drivingly connecting the driver 112 with the ring gear 126 includes a pawl 130 on the driver and a ratchet rim 132 on the ring gear. A second clutch 134 including a pawl 136 on the driver 112 and a ratchet rim 138 on the planet carrier 122 is biased toward engagement by a pawl spring 140, and normally disengaged by a first centrifugal governor 142 including a centrifugal weight 144 mounted on the driver 112 by means of a pivot pin 146, and biased toward the clutch disengaging position by a return spring 150, a boss 148 on the weight 144 normally engaging the pawl 136. The structure described so far is closely analogous to that shown in FIG. 1.

The mechanism 116 includes a second set 111 of planetary gearing consisting of a sun gear 113 fixedly mounted on the shaft 110, a planet carrier 115 rotatable on the shaft and carrying planet gears 117 which mesh with the sun gear 113 and with a ring gear 119. The latter is fixedly coupled with the planet carrier 122 of the first planetary gearing 118.

A third clutch 121 interposed between the planet carrier 115 and the hub shell 114 consists of a pawl 123 on the carrier, a ratchet rim 125 on the hub and a non-illustrated pawl spring. A fourth clutch 127 for connecting the ring gear 119 and the hub shell 114 includes a pawl 129 on the ring gear 119 and a ratchet rim 131 on the hub shell. The clutch 127 is controlled by a second centrifugal governor 133 including a weight 135 pivotally mounted on the ring gear 119 by means of a pin 137 and biased by a return spring 139 toward the illustrated position in which a boss 141 on the weight 135 disengages the pawl 129 from the ratchet rim 131.

A fifth, overrunning clutch 143 is operatively interposed between the ring gear 126 of the first planetary gear set 118 and the hub shell 114 and includes a pawl 145 on the ring gear 126 and a ratchet rim 147 on the hub shell 114. It is shifted between the engaged and disengaged positions by a third centrifugal governor 149 including a centrifugal weight 151 pivoted on a pin 153 which projects from the ring gear 126 and a return spring 155 which normally holds a boss 157 on the weight 151 in engagement with the pawl 145 to retract the pawl into the illustrated, inoperative position.

The illustrated four-speed hub operates as follows:

At very low rotary speeds of the wheel centered in the hub and not otherwise shown, torque is transmitted from the driver 112 to the hub shell 114 by the first clutch 128, the ring gear 126 of the first planetary gearing 118, the planet carrier 122, the ring gear 119 of the second planetary gearing 111, the planet carrier 115, and the third clutch 121. The speed is reduced in each of the planetary gear sets 118, 111, and the hub shell 114 is rotated ta the first or lowest transmission ratio of which the hub is capable.

At increasing speed, the first governor 142 permits engagement of the second clutch 134, and torque is transmitted from the driver 112 to the planet carrier 122, the ring gear 119, the planet gears 117, the planet carrier 115, the third clutch and the hub shell which is driven at a second or lower intermediate speed lower than that of the driver 112. The ratchet rim 132 of the first clutch 128 overtravels the pawls 130.

At yet higher speed, the fourth clutch 127 is permitted to engage by the second centrifugal governor 133. Torque is transmitted from the driver 112, in sequence, to the second clutch 134, the planet carrier 122, the fourth clutch 127, and the hub shell 114. The hub shell is coupled to the driver for joint rotation at the same speed at the third transmission ratio of the hub.

When the speed of the wheel increases further, the third centrifugal governor 149 releases the pawl 145 of the fifth clutch 143, and the hub shell 114 is rotated by the driver 112 and a motion transmitting train which includes the second clutch 134, the planet carrier 122, the planet gears 124, the ring hear 126, and the fifth clutch 143. The hub shell 114 rotates at the speed of the ring gear 126 which is higher than that of the driver 112 by the fourth transmission ratio of the hub.

Obviously, centrifugally controlled automatic transmissions having more than four speeds can be designed in the manner of the invention as described with reference to the three- and four-speed hubs. The number of speeds provided is limited solely by the mechanical strength of the materials of construction employed which controls the dimensions of the several hub elements, and by the limitations to the size of the hub shell in which the transmission mechanism is to be housed.

The multiple-speed hubs of the invention provide any desired number of transmission ratios or speeds $n$ with $n-2$ sets of planetary gears, and the reduction in the number of planetary gear sets to two less than the number of available transmission ratios is provided by at least two clutches which connect elements of the motion transmitting trains, but are not attached to the hub shell itself.

In the illustrated preferred embodiments of the invention, each centrifugal governor is associated with two clutches of which one is a simple overrunning clutch transmitting torque in the operative condition of the governor, and the other clutch is engaged when the governor moves from the operative to the inoperative condition under adequate centrifugal forces, the overrunning clutch becoming ineffective when the controlled other clutch is thereby engaged.

FIGS. 2 to 4 illustrate variations and permutations of individual elements in the hub of FIGS. 1, 5, and 6, but other, and more far-reaching modifications and variations will readily suggest themselves to those skilled in the art on the basis of the foregoing teachings. It should therefore be understood that the invention can be practiced otherwise than as specifically disclosed.

What is claimed is:

1. In a multiple-speed hub for a bicycle and like vehicle having a normally stationary shaft (10,110) having an axis, a driver member (12,112) and a hub shell member (14,114) mounted on said shaft for rotation relative to the shaft and relative to each other, transmission means (16,116) in said hub shell member and operatively interposed between said members for rotating said hub shell member at each of a plurality of speeds or transmission ratios when said driver member rotates about said axis, said transmission means including a set of planetary gearing (18,118) including a sun gear (20,120) fixedly fastened to said shaft, a planet carrier (22,122) and a ring gear (26,126) rotatable about said axis, planet gear means (24,124) mounted on said planet carrier in simultaneous meshing engagement with said sun gear and said ring gear, and clutch means for transmitting torque from said driver member to said hub shell member, said clutch means including a first clutch (28,128) operatively interposed between said driver member and said ring gear, a second clutch (34,134) operatively interposed between said driver member and said planet carrier, a third clutch (52,127) operatively interposed between said planet carrier and said hub shell member, and a fourth clutch (58,143) operatively interposed between said ring gear and said hub shell member, the improvement which comprises:

a. said first clutch being an overrunning clutch permitting free rotation of said hub shell member at a speed higher than the rotary speed of said driver member;
  b. centrifugal governor means (44,144); and
  c. means for operatively connecting said governor means to said second clutch and to a first one of said members and for thereby operating said second clutch in response to a change in the rotary speed of said first member.

2. In a hub as set forth in claim 1, second centrifugal governor means (66,151), and means operatively connecting said second governor means to said fourth clutch and to one of said members and for thereby operating the fourth clutch in response to a change in the rotary speed of the connected member, said third clutch being an overrunning clutch.

3. In a hub as set forth in claim 1, a second set (111) of planetary gearing, said second set including a sun gear (113), a planet carrier (115), a ring gear (119), and a planet gear (117) mounted on said planet carrier of the second set in meshing engagement with the sun gear and ring gear of said second set, connecting means connecting the ring gear of the second set with the planet carrier of the first-mentioned set for joint rotation, an additional overrunning clutch (121) operatively interposed between said planet carrier of the second set and said hub shell member, additional centrifugal governor means (133) for operating said third clutch in response to changes in the rotary speed of one of said member, and further centrifugal governor means (151) for operating said fourth clutch in response to changes in the rotary speed of one of said members.

4. In a hub as set forth in claim 3, each of the clutches operated by one of said centrifugal governor means including a pawl portion and a ratchet portion, and a support for the pawl portion, and the associated governor means including a flyweight movably mounted on said support, said pawl portion being movable on said support toward and away from a position of torque-transmitting engagement with the associated ratchet portion.

* * * * *